United States Patent [19]

Mallary

[11] Patent Number: 5,311,386
[45] Date of Patent: May 10, 1994

[54] TRANSDUCER WITH IMPROVED INDUCTIVE COUPLING

[75] Inventor: Michael I. Mallary, Berlin, Mass.

[73] Assignee: Digital Equipment Corporation, Maynard, Mass.

[21] Appl. No.: 721,233

[22] Filed: Jun. 26, 1991

Related U.S. Application Data

[63] Continuation-in-part of Ser. No. 603,162, Oct. 25, 1990, Pat. No. 5,184,267, which is a continuation-in-part of Ser. No. 360,334, Jun. 2, 1989, abandoned.

[51] Int. Cl.$^5$ .......................... G11B 5/147; G11B 5/17
[52] U.S. Cl. .................................... 360/126; 360/123; 360/125
[58] Field of Search ............... 360/119, 123, 125, 126; 428/336

[56] References Cited

U.S. PATENT DOCUMENTS

| | | | |
|---|---|---|---|
| 3,549,825 | 12/1970 | Trimble | 179/100.2 |
| 3,967,368 | 7/1976 | Brock et al. | 29/603 |
| 4,100,583 | 7/1978 | Koel et al. | 360/113 |
| 4,165,525 | 8/1979 | Koel et al. | 360/125 |
| 4,223,360 | 9/1980 | Sansom et al. | 360/123 |
| 4,335,410 | 6/1982 | Neu | 360/123 |
| 4,374,403 | 2/1983 | Oshima et al. | 360/113 |
| 4,376,337 | 3/1983 | Kobayasi et al. | 29/603 |

(List continued on next page.)

FOREIGN PATENT DOCUMENTS

| | | |
|---|---|---|
| 0114076 | 7/1984 | European Pat. Off. . |
| 0154005 | 9/1985 | European Pat. Off. . |
| 0281931 | 9/1988 | European Pat. Off. . |
| 0147126 | 7/1989 | European Pat. Off. . |
| 0353911 | 2/1990 | European Pat. Off. . |
| 0400793A3 | 12/1990 | European Pat. Off. . |
| 0401983 | 12/1990 | European Pat. Off. . |
| 0482956 | 4/1992 | European Pat. Off. . |
| 54-5710 | 1/1979 | Japan . |
| 57-164416 | 10/1982 | Japan . |
| 60-129915(A) | 7/1985 | Japan . |
| 60-059515 | 8/1985 | Japan . |
| 60-175205(A) | 9/1985 | Japan . |
| 61-085612 | 1/1986 | Japan . |
| 1-166309(A) | 6/1989 | Japan . |
| 2-37513(A) | 2/1990 | Japan . |

OTHER PUBLICATIONS

Maruyama et al.; A Yoke Magnetoresistive head for High Track Density Recording; *IEEE;* 1987; pp. 2503-2505.
W. W. Chow; Multi-Turn Core and Winding for Thin Film Inductive Head; *IBM, Corp.;* 1982; p. 4479.
Vinal, (IBM Technical Disclosure Bulletin, vol. 25, No. 7B, Dec. 1983).
Jeffers, "Magnetoresistive Transducer with Canted Easy Axis", *IEEE Transactions on Magnetics,* vol. MAG-15, No. 6, Nov. 1979, pp. 1628-1629.
Oshiki, "A Thin-Film Head for Perpendicular Magnetic Recording", J. Appl. Phys., 53(3), Mar. 1982, pp. 2593-2595.
Potter, "Self-Consistent Computer Calculations for Perpendicular Magnetic Recording", *IEEE Transactions on Magnetics,* vol. MAG-16, No. 5, Sep. 1980, pp. 967-972.
Shinagawa, "Simulation of Perpendicular Recording on Co-Cr Media with a Thin Permalloy Film-Ferrite Composite Head", J. Appl. Phys., 53(3), Mar. 1982, pp. 2585-2587.

*Primary Examiner*—Stuart S. Levy
*Assistant Examiner*—Jefferson Evans
*Attorney, Agent, or Firm*—Fish & Richardson

[57] ABSTRACT

A thin film magnetic transducer is formed in a plurality of layers and comprises a yoke with at least one arm having segments respectively lying in separate layers and connected through a transition layer, and one or more coils; the coil (or coils) and the yoke are intertwined to provide more than two flux interactions therebetween. In one aspect, the segments of the arm are oriented obliquely to each other and have easy axes of magnetization respectively transverse to the directions of flux conduction through the segments, and the segments are joined together so that flux can pass between them without flowing parallel to the easy axis of any of the segments.

31 Claims, 11 Drawing Sheets

U.S. PATENT DOCUMENTS

| | | | |
|---|---|---|---|
| 4,535,375 | 8/1985 | Mowry et al. | 360/113 |
| 4,566,050 | 1/1986 | Beam et al. | 360/113 |
| 4,613,918 | 9/1986 | Kanai et al. | 360/113 |
| 4,626,946 | 12/1986 | Vinal | 360/113 |
| 4,626,947 | 12/1986 | Narishige et al. | 360/126 |
| 4,639,811 | 1/1987 | Diepers et al. | 360/125 |
| 4,649,447 | 3/1987 | Huang et al. | 360/113 |
| 4,656,546 | 4/1987 | Mallory | 360/110 |
| 4,663,685 | 5/1987 | Tsang | 360/113 |
| 4,668,913 | 5/1987 | Vinal | 324/235 |
| 4,695,351 | 9/1987 | Mallary | 204/15 |
| 4,698,711 | 10/1987 | Vinal | 360/113 |
| 4,745,506 | 5/1988 | Nakamura et al. | 360/123 |
| 4,803,580 | 2/1989 | Mowry | 360/113 |
| 4,816,947 | 3/1989 | Vinal et al. | 360/113 |
| 4,825,318 | 4/1989 | Hoo et al. | 360/121 |
| 4,891,725 | 1/1990 | Mowry | 360/113 |
| 4,912,584 | 3/1990 | Mallary et al. | 360/126 |
| 4,931,886 | 6/1990 | Mallary | 360/123 |
| 5,027,247 | 6/1991 | Nakanishi | 360/126 |
| 5,085,935 | 2/1992 | Mallary | 360/126 |
| 5,089,334 | 2/1992 | Mallary et al. | 360/126 |
| 5,184,267 | 2/1993 | Mallary | 360/126 |
| 5,195,005 | 3/1993 | Mallary et al. | 360/126 |

OTHER PUBLICATIONS

Iwasaki, "An Analysis for the Magnetization Mode for High Density Magnetic Recording", *IEEE Transactions on Magnetics*, vol. MAG-13, No. 5, Sep. 1977, pp. 1272–1277.

Mallary et al., "Frequency Response of Thin-Film Heads with Longitudinal and Transverse Anisotropy", *IEEE Transactions on Magnetics*, vol. 26, No. 5, Sep. 1990, pp. 1334–1336.

Mallary et al., "Three-Dimensional Transmission Line Model for Flux Conduction in Thin-Film Recording Heads", J. Appl. Phys., 67(9), May 1990, pp. 4863–4865.

Mallary et al., "Conduction of Flux at High Frequencies by a Charge Free Magnetization Distribution", *IEEE Transactions on Magnetics*, vol. 24, No. 6, Nov. 1988, 2374–2376.

Michael L. Mallary; "Conduction of Flux at High Frequencies in Permalloy Strips by Small-Angle Rotations"; J. Appl. Phys., 57(1), Apr. 15, 1985; pp. 3952–3954.

Lazzari et al., "A New Thin Film Head Generation", *IEEE*, pp. 3190–3193.

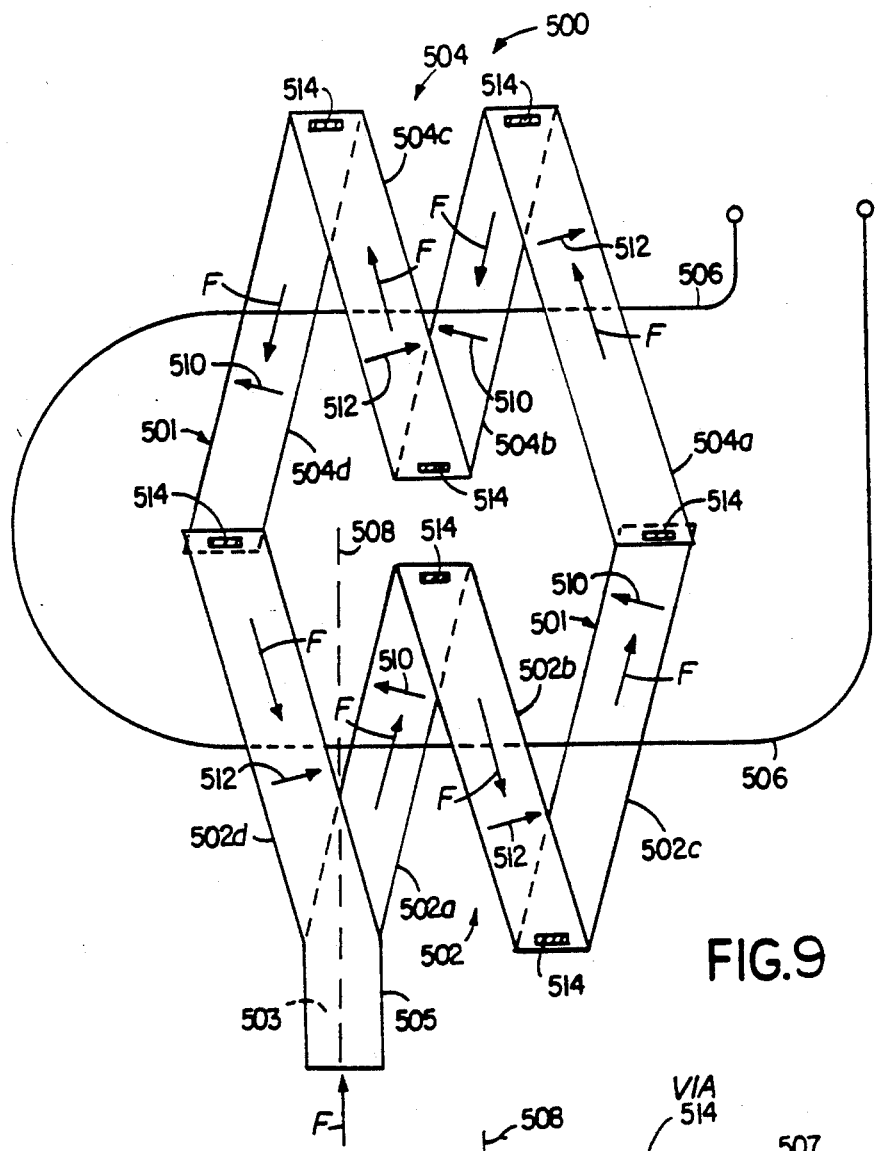
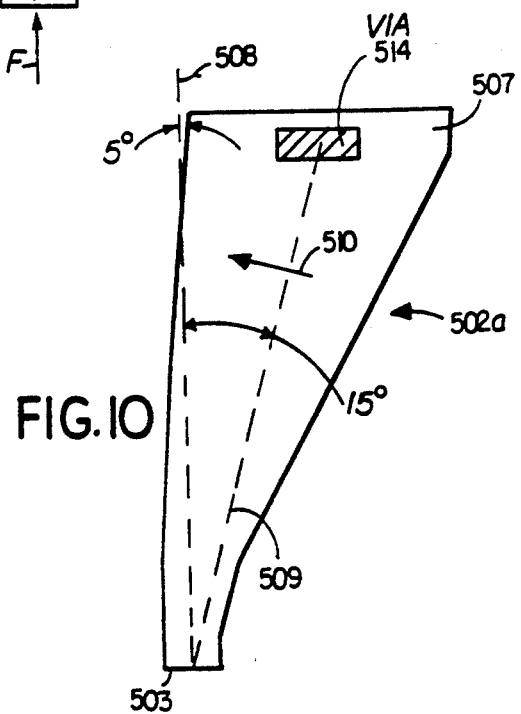
FIG. 9
FIG. 10

TRANSDUCER WITH IMPROVED INDUCTIVE COUPLING

This is a continuation in part of Ser. No. 7/603,162, filed Oct. 25, 1990, now U.S. Pat. No. 5,184,267; which is a continuation in part of Ser. No. 07/360,334, filed Jun. 2, 1989, now abandoned.

BACKGROUND OF THE INVENTION

This invention relates to thin film magnetic transducers (i.e., heads).

Referring to FIG. 1, a typical thin film magnetic head 10 for writing information on or reading information from a recording medium 12, such as a magnetic disk, resembles a horseshoe-shaped yoke 14 of ferromagnetic material (such as nickel-iron) around which a coil 16 is wrapped. Yoke 14 includes a pair of pole pieces 18 the tips of which are located closely adjacent to medium 12.

Information is written on medium 12 by passing electrical current through coil 16 to induce a corresponding magnetic flux in yoke 14. The magnetic flux is conducted through one of the pole pieces 18 to medium 12 via the tip of the pole piece. Changes in the flux caused by varying the electrical current are recorded as magnetic transitions on medium 12. The flux circuit is completed by the return of the magnetic flux to thin film head 10 via the other pole piece. During reading, as head 10 is passed over a pair of magnetic transitions 15, 16 (known as a di-bit) on medium 12, flux emanating from positive transition 15 is conducted up through the one of the pole pieces 18 and returned by the other pole piece to the negative transition 16. The flux conduction through yoke 14 induces a corresponding electrical signal in coil 16.

The amount of flux imparted to the yoke during writing by the coil depends upon the write current level, the number of coil turns, and the reluctance of the pole, among other factors. Similarly, the level of the voltage induced in the coil during reading depends upon factors such as the number of coil turns, the strength of the flux presented to the coil as it travels through the yoke, and the reluctance of the yoke. The flux-current relationship in a magnetic head is termed the inductive coupling between the yoke and the coil.

Referring to FIGS. 2A-2C, the ferromagnetic material of the pole pieces 18 includes numerous microscopic regions, called domains 20, within which magnetic dipoles 22 of the material are aligned. The material is formed (by deposition or annealing) in the presence of a directional magnetic field to cause the dipoles 22 of some of the domains 20 to become aligned with (i.e., oriented at an angle of 0 degrees or 180 degrees to) the magnetic field direction. The direction at which the dipoles are aligned represents the preferred axis of magnetization of the pole piece and is called the easy axis 24. The dipole alignment of the domains in the interior of the material and the domains near the edges of the material is such that the magnetic flux generated by the dipoles 22 remains within the material in the absence of an externally applied magnetic field (FIG. 2A).

When magnetic flux is applied to the yoke (either by passing current through the coil during writing or by passing the pole over magnetic flux transitions on the medium during reading) the flux is conducted through the material in one of two ways. One way is by so-called "wall motion", which occurs when the flux 26 is applied in a direction parallel to the easy axis 24 (FIG. 2B). The flux 26 causes domains 20 having dipoles 22 that are aligned with the direction of flux conduction 26 to increase in size (at the expense of those domains whose dipoles are disposed opposite to the flux direction) as magnetic dipoles from adjacent domains reorient themselves (e.g., by 180 degrees) to become aligned with the direction of flux conduction. As each domain grows in size, its walls 21 move to define new boundaries between the domains.

Flux conduction by wall motion is undesirable for several reasons. First, defects, such as impurities, in the material impede the movement of the domain walls 21. When a domain wall encounters an impurity, the impurity temporarily holds (i.e., "pins") the wall at the site of the impurity, preventing it from moving at the point of the impurity. The remainder of the wall continues to move, causing the wall to "stretch" and storing energy in the wall. When the wall stores sufficient energy to free itself from the hold of the impurity, the wall breaks free suddenly, releasing the stored energy as a burst of electrical noise (known as "Barkhausen noise") which obscures the information signal.

The applied flux must exceed a threshold to assure that the walls 21 will be able to gather enough energy to move past the impurities. As a result, flux conduction by wall motion is somewhat insensitive to the low flux levels with which thin film heads are typically used during read operations (that is, the material has low permeability at low flux levels).

In addition, the domain walls 21 cannot be rapidly moved, and as a result, flux conduction by wall motion is unsuitable in applications in which high frequency changes in magnetic flux are encountered.

A second mechanism by which flux is conducted through magnetic material is by rotation of the magnetic dipoles 22 of the domains. This is done by applying the flux 26 in a direction transverse (such as perpendicular) to the easy axis 24 (FIG. 2C). Because domain wall motion is not relied upon to conduct the flux, "pinning" is not encountered and Barkhausen noise is eliminated. Further, the domain dipoles 22 need only rotate slightly to conduct the flux through the material. As a result, flux conduction by rotation is responsive to high frequency flux variations as well as low applied flux levels (that is, permeability is high even at low levels of applied flux).

SUMMARY OF THE INVENTION

One general aspect of the invention is a thin film magnetic transducer formed in multiple layers that includes a yoke having at least one arm which includes segments lying in separate layers and connected through a transition layer; a coil is intertwined with the yoke to provide more than two flux interactions therebetween.

The multiple flux interactions significantly increase the inductive coupling between the yoke and the coil. Thus, compared with transducers that have only a single flux interaction, a given amount of flux conducted by the yoke during reading induces a greater electrical signal in the coil, and during writing an increased level of flux is generated in the yoke in response to the write signal applied to the coil. In general, the induced electrical signal and the induced flux are increased by a factor equal to the increased number of flux interactions.

Preferred embodiments include the following features.

The coil includes multiple turns and lies at least in part in the transition layer. The segments are connected by a via that passes through the transition layer. The yoke is constructed from ferromagnetic material, such as a nickel-iron-cobalt alloy.

In one embodiment, the yoke includes a second arm, segments of which lie in separate layers and are connected through the transition layer; segments of the arms are connected together through the transition layer to form a multiple-pole magnetic transducer that provides a flux path with a storage medium. The multiple pole transducer provides a total of four flux interactions with each turn of the coil. In another embodiment, a monopole transducer is provided by constructing the yoke from a single arm; the arm is intertwined with the coil to provide three flux interactions with each winding.

An important concept provided by the invention is constructing and arranging the yoke to conduct magnetic flux predominantly by rotation rather than by wall motion. As a result, the transducer is well suited for use in applications where high frequency changes in magnetic flux occur. The transducer is also highly responsive to low flux levels (that is, the transducer has high permeability at low flux levels). The avoidance of flux conduction by wall motion significantly reduces Barkhausen noise.

In a general aspect of this concept, the arm of the intertwined yoke has segments that are oriented obliquely to each other and have easy axes of magnetization respectively transverse to the directions of flux conduction through the segments; the segments are joined together so that flux can pass between them without flowing parallel to the easy axes. As a result, the flux conducts essentially entirely by rotation through the arm.

Preferred embodiments include the following features.

In one embodiment, in which the transducer includes two poles, the yoke comprises an additional arm with obliquely oriented segments that have easy axes arranged transverse to the direction of flux conduction therein. The segments of the second arm are joined together so that flux passes between the arms without conducting parallel to the easy axes. A segment of the second arm is connected to a segment of the first arm to complete the magnetic circuit in the multi-pole transducer. The segments of each arm lie in separate layers of a thin film magnetic transducer, and are joined through a transition layer disposed between the layers. Likewise, the arms are connected through the transition layer. The coil is disposed at least partially in the transition layer. The easy axis of each segment is perpendicular to the direction in which the segment extends. This substantially eliminates conduction by wall motion within each segment.

In another embodiment in which the transducer is a monopole device, a single arm is provided. Near the pole tip, the surface area of the arm is relatively small, and the arm includes a portion that has a relatively large surface area to radiate flux from the arm to surrounding regions. The large portion thus serves as a "magnetic tail" to complete the flux path with the storage medium.

Yet another aspect of the invention features a process for forming a yoke of a magnetic transducer in which the substrate on which the yoke will be formed is positioned to provide an oblique angle between the axis of the substrate and a first direction, and a segment of the yoke is formed along the first direction so that the segment is oriented at the oblique angle to the axis; a magnetic field is applied to induce an easy axis of magnetization in the segment while the substrate is angled to the first direction.

Preferred embodiments include the following features.

The segment is formed by depositing ferromagnetic material on the substrate, and the magnetic field is applied during deposition. The magnetic field is applied transverse, and preferably perpendicular, to the first direction. The direction of the applied field and the oblique angle are selected to arrange the easy axis in a predetermined orientation with respect to the extent of the segment.

The segment is annealed. This avoids degradation in the level of anisotropy over time (a phenomena known as "magnetic aging"). The annealing is controlled to minimize temperature-induced changes the orientation of the easy axis. For example, the anneal is performed at a temperature lower than that which would normally be used to anneal the ferromagnetic material. Another way in which undesired changes in the easy axis orientation can be overcome is to select the direction of the magnetic field and the angle at which the substrate is disposed to compensate for the annealing-induced changes. For example, if the segment is to have an easy axis oriented at 15° with respect to a normal to the axis of the substrate, and annealing causes the easy axis orientation to relax by 4.5°, the segment is provided with a pre-annealing easy axis angle of 19.5°.

A coil is formed for the yoke and supported by the substrate. The coil is separated from the yoke segment with a material (such as photoresist) which is heated to cause the material to serve as an electrical insulator between the yoke and the coil. The heating also serves to at least partially anneal the yoke segment.

After the first segment is formed, the substrate is repositioned to provide a second oblique angle between the substrate axis and the first direction. A second segment of the yoke is then formed along the first direction, and a magnetic field is applied to induce an easy axis of magnetization in the second segment. As a result, the second segment is oriented at the second angle with respect to the axis of the substrate, and is also canted with respect to the first-formed segment. A plurality of the first-formed segments are made, all of which are formed at the same oblique angle. A plurality of the second segments, all oriented at the second oblique, are formed and are selectively connected to the first-formed segments to fashion the yoke.

The segments are formed in separate thin film layers and are separated by a transition layer. The segments are joined together through the transition layer at an intersection between them. Each segment is annealed in the presence of a magnetic field. Because the annealing of the second segment may change the orientation of the easy axis of the first segment, the annealing is controlled (such as by the techniques discussed above) to minimize the changes. For example, the first layer is annealed at 260° Centigrade, and the temperature is reduced (such as to 200° Centigrade) during annealing of the second segment.

Other features and advantages of the invention will become apparent from the following detailed description, and from the claims.

DESCRIPTION OF THE PREFERRED EMBODIMENTS

We first briefly describe the drawings.

FIG. 9 illustrates another embodiment of the invention in which four flux interactions are provided between the poles and the coil of a thin film magnetic head.

FIG. 10 shows one of the pole segments of the head of FIG. 9 in more detail.

STRUCTURE AND OPERATION

Figure 1:
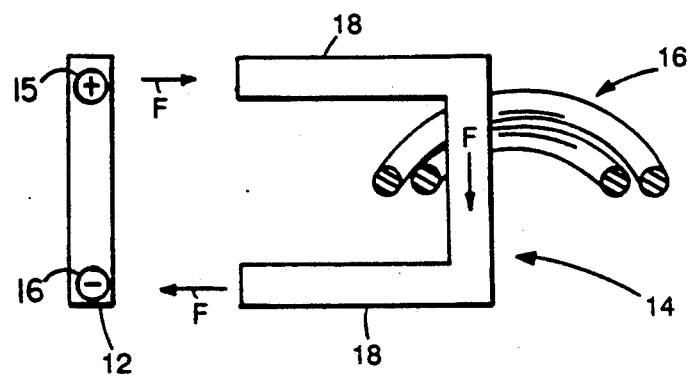
FIG. 1 is a diagrammatic side view of a prior art magnetic head.
Figure 3:
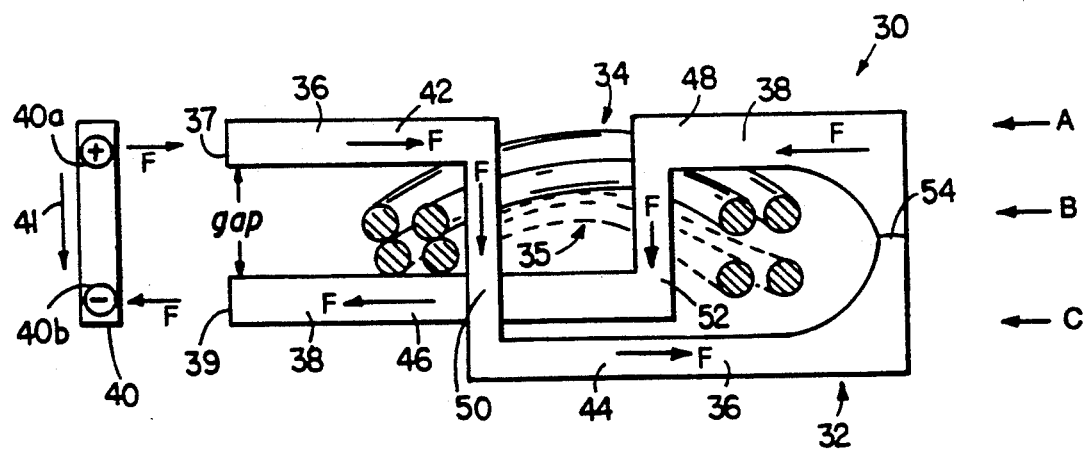
FIG. 3 is a diagrammatic side view of one embodiment of the thin film magnetic head of the invention.

Referring to FIG. 3, thin film magnetic head 30 includes a yoke 32 of ferromagnetic material (such as a nickel iron alloy) intertwined with a multiturn, planar coil 34 (also known as a pancake coil) in such a way as to provide multiple flux interactions between yoke 32 and coil 34 and thereby significantly increase the inductive coupling therebetween as compared with conventional thin film magnetic heads (FIG. 1). Specifically, yoke 32 is constructed with pole pieces 36, 38 (i.e., arms) that are woven through coil 34 so that magnetic flux interacts with coil 34 twice as the flux is conducted through pole pieces 36, 38 to or from magnetic storage medium 40.

Pole piece 36 includes a pair of elongated segments 42, 44 that lie in planes (or strata) A and C, respectively, that are disposed above and below the plane (or strata) B in which coil 34 is disposed. Similarly, pole piece 38 includes a pair of elongated segments 46, 48 that are respectively disposed in strata C and A. Strata B serves as a transition layer to magnetically separate segments 36 and 48 from segments 38 and 44. The ends of segments 42, 46 disposed adjacent to storage medium 40 serve as the tips 37, 39, respectively, of pole pieces 36, 38. Tips 37, 39 are spaced by a gap of predetermined width.

The other end of segment 42 is connected to segment 44 through a via 50 in strata B, which provides a path for the flow of magnetic flux through pole piece 3 that is surrounded by coil 34. Segments 46, 48 of pole piece 38 are similarly connected together through the interior of coil 34 by via 52. Pole pieces 36, 38 are connected together by a third via 54 that passes through strata B to join the ends of segments 44 and 48.

In use, considering a read operation of a pair of magnetic transitions 40a, 40b (collectively called a dibit) on storage medium 40 (which is travelling in the direction of arrow 41 under head 30), magnetic flux F emanating from positive transition 40a enters the tip 37 of pole piece 36, travels through yoke 32, and returns to negative transition 40b from the tip 39 of pole piece 38. As the flux is conducted through pole pieces 36, 38, it passes through the interior of coil 34 twice in the same direction (i.e., downward as shown in FIG. 3)—once as the flux is coupled by via 50 from segment 42 to segment 44, and again as the flux conducts from segment 48 to segment 46 through via 52.

The electrical signal induced in coil 34 by the passage of flux through pole piece 36 adds to the electrical signal generated in coil 34 by the conduction of the same flux in pole piece 38, resulting in an increased signal relative to a head in which the flux passes through the coil only once. The two-pass configuration shown in FIG. 3 is equivalent to doubling the effective number of turns of coil 34 without physically increasing the number of turns. In general, if the number of coil turns is increased by (n) and the number of passes through the coils is designated by (m), an (n×m) improvement over a single turn coil and single pass yoke is realized by the invention.

By including one or more additional coils 35 (shown in dotted lines in FIG. 3) serially connected to coil 34, the inductive coupling to yoke 32 can be increased still further. For example, head 30 constructed with two coils 34, 35, each of which has 14 turns, would produce the same electrical signal as a conventional head having a single coil with 56 turns (2 coils×14 turns/coil×2 flux passes through each coil=56 turn-flux interactions).

Increasing the effective number of turns without the need to physically build more turns into the coil has a number of advantages. Because the actual length of the coil need not be increased, increases in processing complexity, overall coil inductance, and total coil resistance are avoided.

Figure 4:
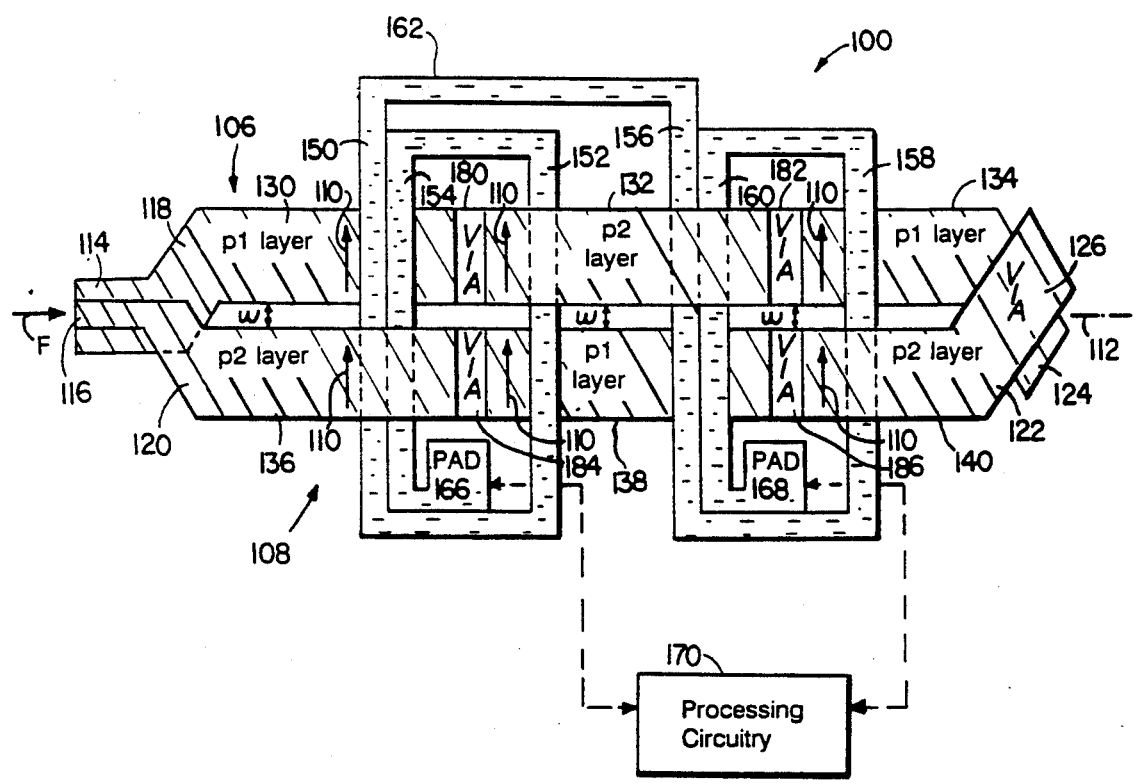
FIG. 4 is a top view of another embodiment of the thin film magnetic head of the invention.

FIG. 4 shows a top view of a thin film magnetic head 100 that includes a pair of planar coils 102, 104 disposed side by side in the same plane in strata B, instead of being stacked, as are coils 34, 35 of FIG. 3. (Because coils 102, 104 are in the same plane, they can be deposited in the same process step, thereby eliminating as many as three hard bake insulating layers, one conducting copper layer, and several via exposures). Each one of a pair of elongated, ferromagnetic pole pieces 106, 108 passes through each coil 102, 104. As discussed below, each pole piece 106, 108 is formed in the presence of a magnetic field to have an easy axis 110 that is in the plane of the pole piece and perpendicular to a longitudinal axis 112 along which the pole pieces 106, 108 are generally disposed.

Pole pieces 106, 108 are spaced apart laterally by a distance W over most of their lengths to limit magnetic flux leakage therebetween and to provide sufficient room for two passes through coils 102, 104. But the tip 114 of pole piece 106 is disposed underneath the tip 116 of pole piece 108 and is spaced therefrom by a gap (see FIG. 3). Tips 114, 116 are parallel to longitudinal axis 112 and are joined to the remainders of respective pole pieces 106, 108 by sections 118, 120, which are disposed at opposite angles with respect to longitudinal axis 112. At the opposite end of head 100, an angled section 122 of pole 108 overlays an oppositely-angled section 124 of pole 106 and is connected thereto by a via 126. Angled sections 118, 120, 122, and 124 also have an easy axis oriented perpendicular to longitudinal axis 112.

Thin film magnetic head 100 is disposed in three layers or strata (strata A-strata C) that are deposited sequentially during fabrication. First, layer p1 is deposited in the presence of a magnetic field to form sections 130 and 134 of pole 106 and section 138 of pole 108 on an insulating substrate (not shown) in strata A. Section 130 includes angled region 118 and tip 114.

After a thin layer of insulation (not shown) is placed over strata A, a copper layer is deposited to form coils 102 and 104 in strata B. Each coil 102, 104 includes numerous turns (each coil is shown with only two turns for clarity). Specifically, coil 102 includes interconnected paths 150, 152, and 154, with paths 156, 158, and 160 forming coil 104. Paths 150 and 156 are interconnected by path 162. Paths 154 and 160 terminate at respective pads 166, 168. Pads 166 and 168 are connected to processing circuitry 170, which drives coils 102, 104 during writing and senses the signals produced on the coils by magnetic flux during reading.

Then, another thin layer of insulation, not shown, is deposited over coils 102, 104, and layer p2 is deposited in the presence of a magnetic field to form section 132 of pole 106 and sections 136 (including tip 116 and angled section 120) and 140 of pole 104 in strata C.

Sections 130, 132, and 134 of pole piece 106 are connected together by forming vias 180, 182 between layers p1 and p2 through strata B. Vias 184, 186 are formed in a similar fashion to interconnect sections 136, 138, and 140 of pole piece 108. Via 126 is formed at this time as well to connect pole pieces 106, 108 together.

In operation, considering a read operation of a dibit, magnetic flux F from emanating from the positive transition (not shown) enters one of the pole pieces, for example, pole piece 106 through its tip 114. The flux passes through coils 102, 104 twice as it conducts through pole pieces 106, 108: once as the flux passes through segments 130, 132, and 134; and again as the flux is conducted through segments 140, 138, and 136. The flux path is completed by the return of the flux to the negative transition (not shown) from tip 116 of pole piece 108. The electric signal induced by the flux in each coil 102, 104 is thus enhanced.

The magnetic fields that are applied during the deposition of the p1 layer and the p2 layer are oriented in the plane of each layer and perpendicular to longitudinal axis 112 to provide pole pieces 106, 108 with an easy axis 110 that is perpendicular to the elongated sections of the pole pieces (i.e., sections 130-140). Thus, throughout most of the length of pole pieces 106, 108, the magnetic flux F travels perpendicular to easy axis 110 and thus is conducted by rotation. (Note that flux conducts by rotation through vias 126 and 180-186 because the vias are disposed perpendicular (i.e., into the paper) to the planes of the pole pieces.)

But the direction of flux conduction is not perpendicular to easy axis 110 in angled sections 118, 120, 122, and 124, and as a result these regions of pole pieces 106, 108 conduct magnetic flux F partially by wall motion. However, pole pieces 106, 108 are constructed and arranged so that the flux conducts through the poles predominantly by rotation rather than by wall motion. Preferably, conduction by wall motion is limited to 25% (most preferably 10% or less) of the total flux conduction. As a result, the deleterious effects of flux conduction by wall motion are minimized.

Because the amount of flux conduction that occurs by wall motion increases as the angle between the flux conduction and easy axis 110 approaches zero, angled sections 118, 120, 122, and 124 are disposed at relatively small oblique angles (e.g., opposite 15 degree angles) with respect to longitudinal axis 112. The flux conducts laterally (with respect to longitudinal axis 112) along the domain walls of angled sections 118, 120, 122, and the small angle that each section makes with the longitudinal axis allows the flux to conduct laterally along several domain walls at once. If the flux encounters a domain wall that is "pinned" by an impurity, it can freely transfer to another wall and continue conduction.

Also, the lengths of the angled sections are small to minimize the extent to which the flux is conducted laterally with respect to longitudinal axis 112. This correspondingly reduces the length over which the flux is conducted by wall motion. For example, the total flux path length provided by pole pieces 106, 108 is approximately 400 microns, but the distance of the flux path laterally with respect to longitudinal axis 112 is less than 30 microns (thus, the ratio of these lengths is greater than 10 to 1).

In addition, the yoke is constructed to minimize the number of times that flux is conducted laterally with respect to longitudinal axis 112 while still achieving multiple passes through each coil 102, 104. That is, while more pole pieces could be added to increase the number of times that the flux is coupled through each coil, to do so would increase the number of times that the flux is conducted laterally to longitudinal axis 112 (and non-perpendicular to easy axis 110) and thereby add to the amount of flux conduction by wall motion. Applicant has found that providing two passes through coils 102, 104 provides an acceptable balance between increased inductive coupling and increased conduction by wall motion.

OTHER EMBODIMENTS

Other embodiments are within the scope of the following claims.

For example, the easy axis can be induced in other ways other than by depositing or annealing the pole pieces in the presence of a magnetic field. For example, the easy axis can be formed by the so-called "angle of incidence" method in which the ferromagnetic material is deposited at a glancing angle to induce the easy axis at the angle of deposit. Alternatively, the easy axis can be produced by a combined selection of the magnetostrictive properties of the material, the stress fields induced in the material during deposition, and the geometry of the pole.

Figure 5:
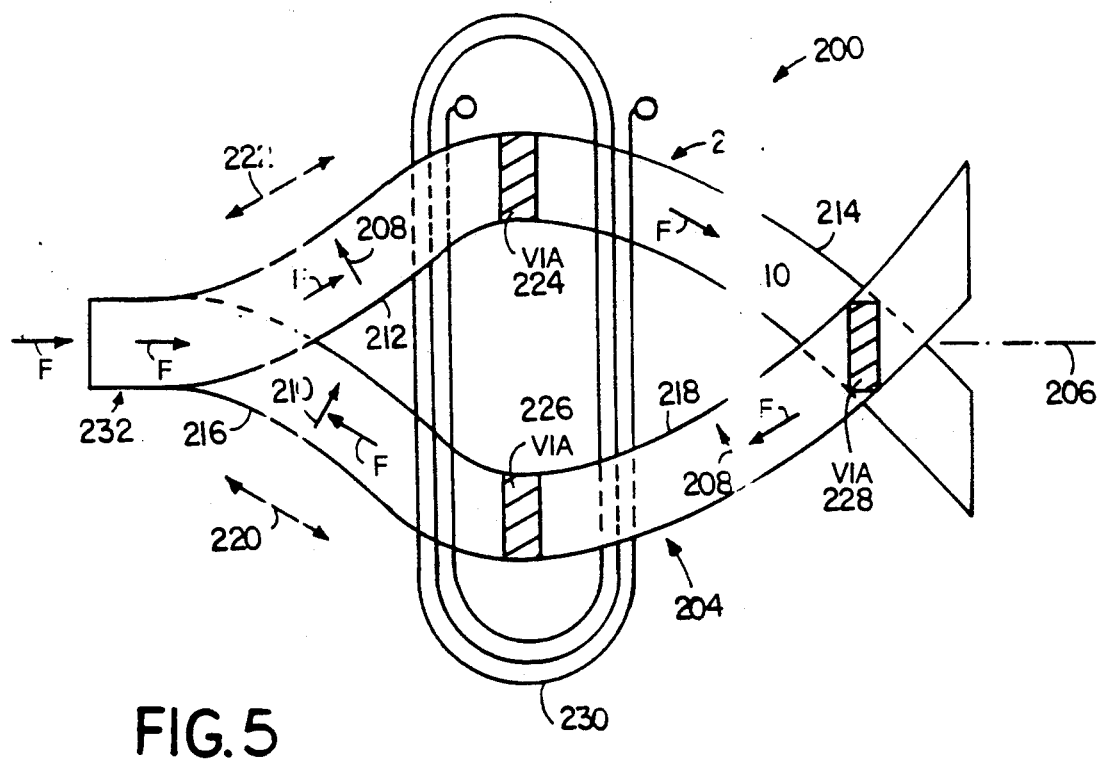
FIGS. 5 and 5A show top views of a thin film magnetic head having the general structure of FIG. 3.
Figure 5A:
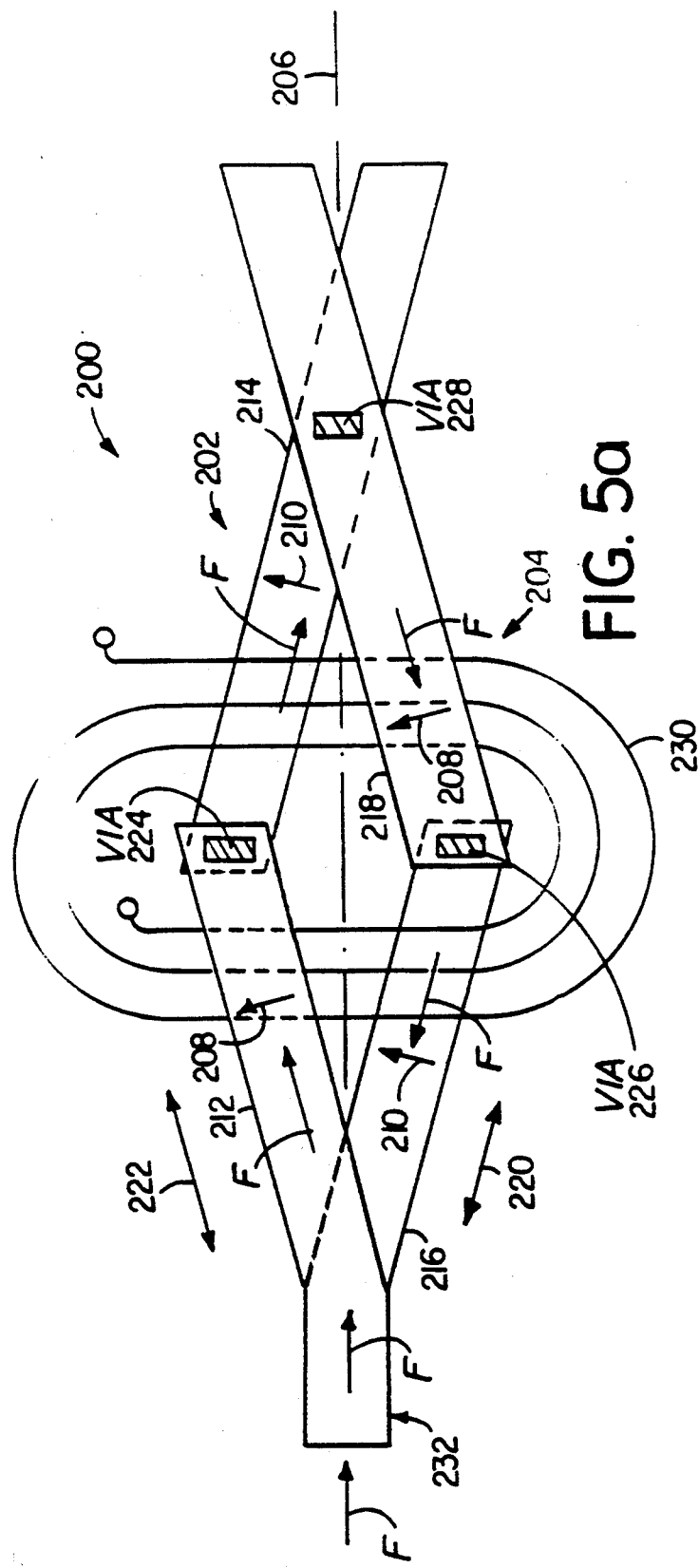

Referring to FIG. 5, thin film magnetic head 200 is constructed to reduce the contribution of conduction by wall motion still further. Pole pieces 202, 204 each include a pair of segments that are disposed at oblique angles to the longitudinal axis 206 of head 200 and that have different easy axes 208, 210 oriented perpendicular to each segment. (The pole segments are shown slightly rounded in FIG. 5 for convenience; the segments may also be straight, as shown in FIG. 5A.) As a result, magnetic flux F flows perpendicular to easy axes 208, 210 and is thus conducted by rotation throughout the entire lengths of pole pieces 202, 204.

Head 200 is fabricated by forming segment 214 of pole 202 and segment 216 of pole 204 parallel to each other and along a line 220 disposed at an angle of approximately 15 degrees to longitudinal axis 206. Segments 214, 216 are formed in the presence of a magnetic field that is oriented perpendicular to the lengths of the segments (i.e., orthogonal to line 220) and in the plane of the segments. After coil 230 is formed, segment 212 of pole 202 and segment 218 of pole 204 are deposited parallel to each other and along a line 222 disposed at an oblique angle to axis 206 opposite to that between line 220 and axis 206. Segments 212, 218 are deposited in the presence of a magnetic field that is perpendicular to line 222 and in the plane of the segments so that the easy axis 208 of segments 212, 218 is perpendicular to the lengths of the segments.

The magnetic flux path through pole pieces 202, 204 is completed by connecting segments 212, 214 together through via 224, interconnecting segments 216, 218 through via 226, and connecting segments 214, 218 together through via 228.

Thus, in operation, magnetic flux F that enters the tip of, e.g., pole piece 202 is conducted down the length of segment 212 by rotation, because the flux is perpendicular to easy axis 208. The flux remains perpendicular to an easy axis (easy axis 210) as it is transferred to segment 214 (and coupled through coil 230 for the first time), and thus the flux is conducted by rotation through segment 214 and into segment 218 for the return trip through coil 230. The flux remains perpendicular to easy axes 208, 210 as it passes through segments 218, 216, and thus completes its conduction through pole piece 20 by rotation.

Near the tips 232 of pole pieces 202, 204, the flux conducts partially by wall motion, because the direction of flux conduction in each pole piece is not strictly perpendicular to easy axes 208, 210. The overall effect of the wall motion is slight, however, due to the short length (e.g., 5 microns) of tips 232.

Figure 6:
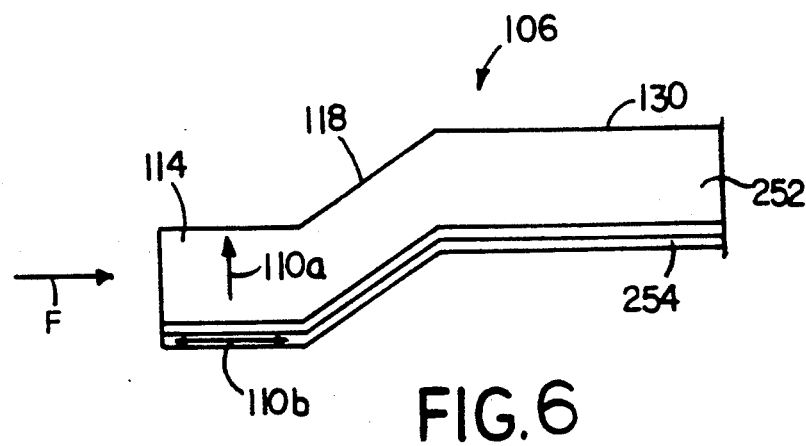
FIG. 6 shows a laminated pole piece according to another embodiment of the thin film magnetic head of the invention.

Referring again to FIG. 4 and to FIG. 6, one way in which flux conduction by rotation can be enhanced (and conduction by wall motion avoided) in thin film head 100 is to form pole pieces 106, 108 from two or more laminated layers that have differently oriented easy axes of magnetization. The use of laminated layers in a thin film head is the subject of U.S. patent application Ser. No. 07/227,808, filed Aug. 3, 1988, by Mallary et al., entitled "Flux Spreading Thin Film Magnetic Devices". The application is assigned to the same assignee as this application and is incorporated herein by reference.

FIG. 6 illustrates segment 130 of pole 106 formed as a pair of laminated layers 252, 254, it being understood that the remaining sections of pole piece 106 and the sections of pole piece 208 are laminated in the same manner. Layers 252 is formed in the presence of a magnetic fields the orientation of which is selected to provide layer 252 with an easy axis 110a disposed perpendicular to the length of segment 130. The direction of the magnetic field in which layer 254 is formed is shifted so that the easy axis 110b of layer 254 is non-perpendicular to the length of segment 130. Ideally, easy axis 110b is oriented perpendicular to easy axis 110a (and is thus arranged parallel to the length of segment 130, as shown in FIG. 6), but axis 110b can alternatively be disposed at a smaller angle with respect to easy axis 110a (for example, 45 degrees, or possibly 20 degrees or less).

In operation, magnetic flux conducts more easily by rotation than by domain wall movement. Stated another way, conduction by domain wall motion presents a higher impedance to the conduction of flux than does conduction by rotation. As magnetic flux F enters segment 130 at tip 114, it conducts entirely by rotation in layer 252 (because there it is perpendicular to easy axis 110a) and thus all of the flux remains in layer 252 at tip 114. When the flux enters angled region 118, it is perpendicular to neither easy axis 110a nor easy axis 110b and thus can not conduct purely by rotation in either layer 252 or layer 254. However, because of the domain structure of layers 252, 254, the flux can conducts by rotation perpendicular to the easy axis of each layer (e.g., layer 252) for a short distance before the domain structure of the layer requires the flux to conduct by wall motion. At this point, the flux is able to conduct by rotation perpendicular to the easy axis of the adjacent layer 254, and as a result, the flux jumps to the adjacent layer so that it can travel through the path of least impedance. The flux continues to jump back and forth between layers 252, 254 along the length of angled region 118 until it reaches the region of section 130 that is oriented perpendicular to easy axis 110a. At this point, the flux can conduct by rotation in layer 252 only, and thus it remains in layer 252 as it passes through the remainder of section 130.

The flux remains in the upper layer as it conducts through sections 132, 134 (i.e., the layer having perpendicular easy axis 110a), until it reaches angled region 124. At this point, the flux jumps between the upper and lower laminated layers 252, 254 as it seeks a path through which it conducts entirely by rotation. The flux resumes conduction in upper layer only when it reaches the region of segment 140 that is disposed parallel to longitudinal axis 112. The flux again conducts through the upper and lower laminated layers when it reaches angled section 120 of pole 108.

Figure 7:
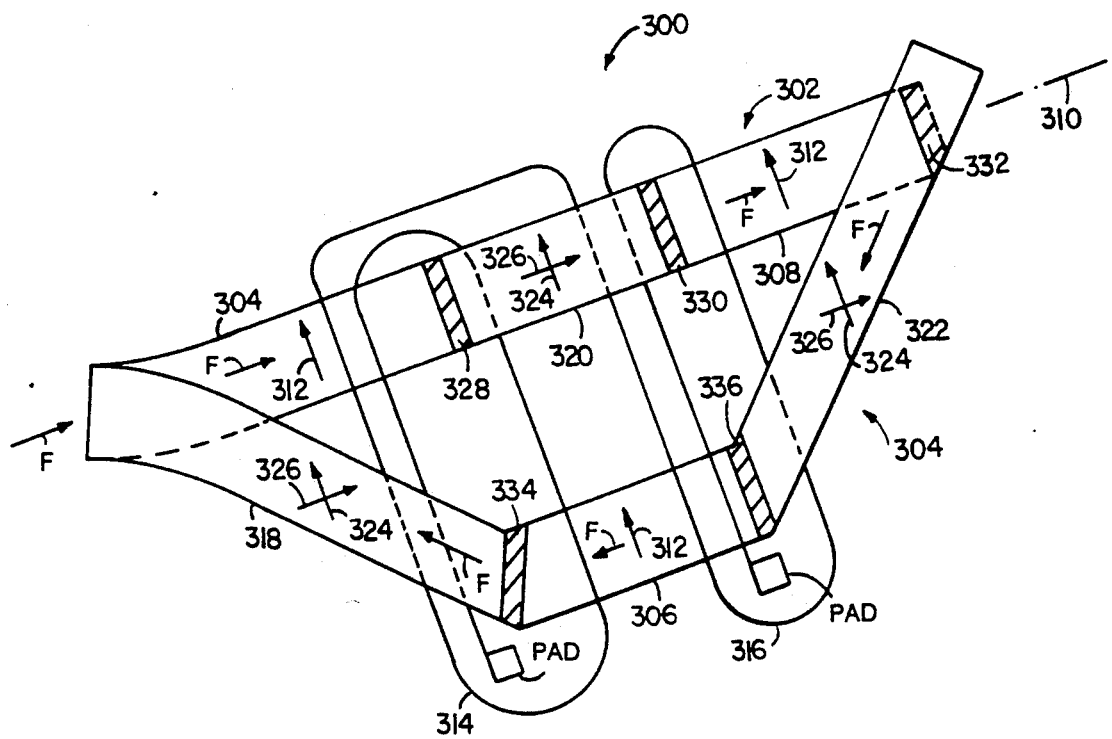
FIG. 7 is a top view of still another embodiment of the thin film magnetic head of the invention.

Referring to FIG. 7, the topology of the pole pieces 302, 304 of thin film head 300 is selected so that lamination of, for example, the pole piece sections in, e.g., strata A (FIG. 3) is unnecessary. The sections 304, 306, and 308 that are deposited in strata A all lie parallel to one another and to axis 310. These sections are formed in the presence of a magnetic field oriented perpendicular to axis 310 so that sections 304, 306, and 308 all have an easy axis 312 disposed perpendicular to their lengths.

After serially coupled coils 314, 316 are fabricated (in strata B), the remaining sections 318, 320, 322 of pole pieces 302, 304 are each formed from a pair of laminated layers. The laminated layers of each section 318, 320, 322 are formed in the presence of orthogonal magnetic fields to have orthogonal easy axes 324, 326, respectively. Easy axis 324 is parallel to easy axis 312, and easy axis 326 is parallel to axis 310, although these orientations are not necessary.

The fabrication of head 300 is completed by forming vias to interconnect the pole piece segments as shown.

In operation, magnetic flux F enters pole piece 302 along longitudinal axis 310 and thus the direction of flux conduction is perpendicular to easy axis 312 of segments 304 and 308, and perpendicular to easy axis 324 of segment 320. Thus, the flux conducts by rotation along the entire length of pole 302.

As the flux returns through pole 304, it also conducts entirely by rotation. This is because the orthogonal easy axes 324, 326 of laminated segments 318 and 322 cause the flux to jump back and forth between the layers of the lamination to find the conduction path of least resistance (as discussed above), and because the direction of flux conduction in segment 306 is perpendicular to easy axis 312.

One advantage of the arrangement of FIG. 7 over a head in which all layers are laminated is that fewer process steps are needed to form the poles. Additionally, because the pole sections disposed underneath (and thus below) coils 314, 316 are not laminated and do not include layers having different easy axes orientations, and there thus is no risk that the relative easy axes orientations could be disturbed by the high processing temperatures used to fabricate the coils.

Figure 8:
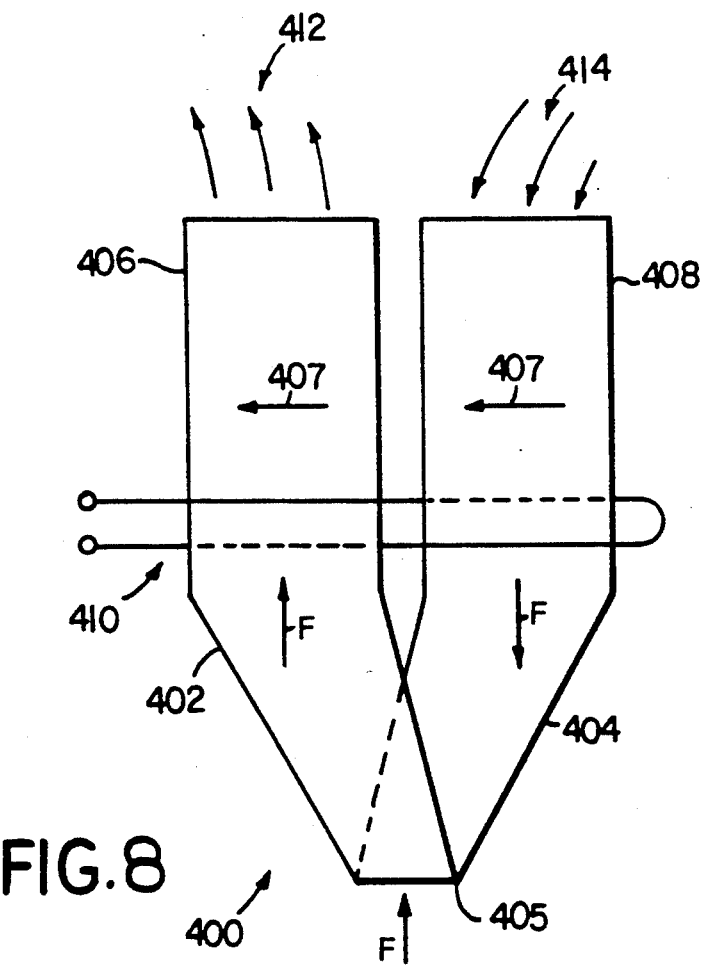
FIG. 8 shows another embodiment of the invention in which the pole pieces are provided with magnetic tails.

Referring to FIG. 8, the pole pieces 402, 404 of thin film magnetic head 400 are provided with regions 406, 406 known as magnetic "tails." Magnetic tails are described in my U.S. Pat. No. 4,931,886, issued Jun. 5, 1990 and entitled "Apparatus and Methods to Suppress Perpendicular Fields in Longitudinal Recording", which is assigned to the present assignee and incorporated herein by reference. Each magnetic tail 406, 408 has a much larger surface area than that of the remainder of the corresponding pole 402, 404. For example, the surface area ratio of each tail to the remainder of the pole is at least 5:1 and preferably 10:1 or greater.

The result is that each tail presents a low impedance leakage path from its pole to the surrounding air, thereby eliminating the need to complete the flux path between poles 402, 404 by connecting the poles together at their far ends (i.e., the ends disposed opposite to tips 405).

In operation, magnetic flux F enters pole 402 from the storage medium (not shown) and is conducted by pole piece through coil 410. The flux is then coupled 412 out of pole piece 402 into the surrounding air via tail 406. Tail 408 acts like an antenna to pull in flux 414 from the surrounding air and couple it as return flux to the storage medium to complete the flux path through head 400. The flux as it conducts through pole 404 passes through coil 410, thereby providing the enhanced inductive coupling between pole pieces 402, 404 and the coil discussed above.

Pole pieces 402, 404 are constructed and arranged according to any of the techniques described above to enhance the conduction of magnetic flux therethrough by rotation. For example, pole pieces 406, 408 have easy axes oriented perpendicularly to the direction of flux conduction through the poles. Because flux F is not required to change direction (i.e., from pole piece 402 to pole piece 404) as it flows through head 400, conduction by domain wall motion is further avoided.

Referring to FIGS. 9 and 10, thin film magnetic head 500 is constructed to provide four flux interactions between a yoke 501 and coil 506 while also providing flux conduction essentially entirely by rotation. Yoke 501 includes a pair of pole pieces 502, 504 (i.e., arms) each of which includes a plurality of segments that are connected to each other to be intertwined with coil 506. (FIG. 9 shows the segments is schematic form; a more typical shape for one of the segments is shown in FIG. 10.) Each segment is oriented at an oblique angle (i.e., canted) to an axis 508 of head 500 (axis 508 is perpendicular to the faces of pole tips 503, 505) and has an easy axis that is transverse to the segment. As a result, magnetic flux conducts by rotation through all of the segments of poles 502, 504 and interacts four times with coil 506 as the flux makes a round trip between pole tips 503, 505. Coil 506 is shown with a single turn, but obviously may include multiple windings.

Pole piece 502 includes segments 502a-502d, and segments 504a-504d comprise pole piece 504. Segments 502a-502d and 504a-504d comprise a nickel-iron-cobalt (NiFeCo) alloy. As with the magnetic heads discussed above, head 500 is manufactured in a plurality of planar layers or strata. The lowermost layer (strata A) includes segments 502a and 502c from pole piece 502, as well as segments 504b and 504d of pole piece 504. Segments 502a, 502c, 504b, and 504d are oriented at a positive angle of 15 degrees with respect to axis 508. (Other angles may be employed, as desired.)

Figure 11:
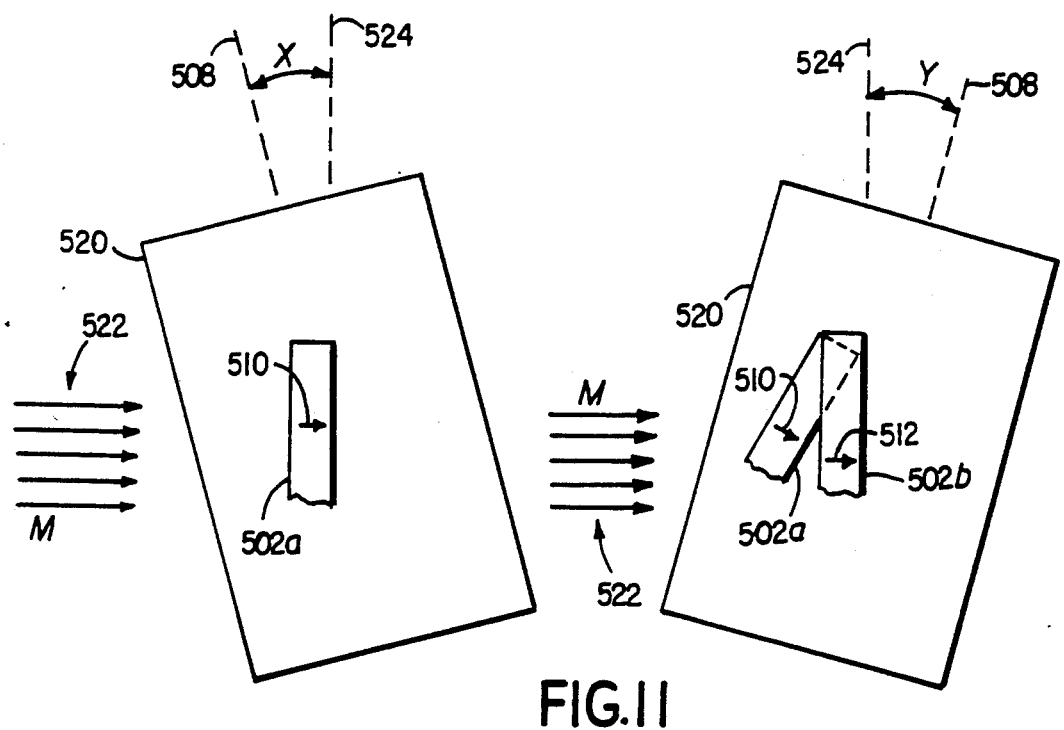
FIG. 11 illustrates the fabrication of the thin film magnetic head of FIG. 9.

Referring also to FIG. 11, segments 502a, 502c, 504b, and 504d (only segment 502a is shown) are deposited on a substrate 520 (such as a wafer) in the presence of a magnetic field M 522 that is applied horizontally to strata A and perpendicular to the lengths of the segments to induce in each segment an easy axis of flux conduction 510 that is transverse (in this embodiment, perpendicular) to the segments. To prepare for the deposition of yoke segments 502a, 502c, 504b, and 504d, substrate 520 is attached to a mount (not shown) so that axis 508 is oriented at the desired angle of cant X (in this example, −15 degrees) with respect to the orientation 524 along which segments 502a-502d will be formed. Then, segments 502a, 502c, 504b, and 504d (and their associated seed layers, not shown) are deposited in while magnetic field M 522 is applied. Note that the direction of field M is perpendicular to the elongated orientation 524 of segments 502a, 502c, 504b, and 504d.

Next, one or more layers of photoresist (not shown) are applied over segments 502a, 502c, 504b, 504d and annealed to form layers of electrical insulation over which the windings (formed from copper) of coil 506 are plated in strata B. An additional layer or layers of photoresist are applied over coil 506 and annealed. The annealing process, also called "hard baking" is discussed in more detail below.

Then, the remaining pole segments (i.e., segments 502b, 502d of pole piece 502 and segments 504a, 504c of pole piece 504) are formed in the uppermost layer, strata C. Segments 502b, 502d, 504a, and 504c are oriented at an opposite oblique angle Y to axis 508 from segments 502a, 502c, 504b, 504d (i.e., at an angle of −15 degrees). As shown in FIG. 11 for segment 502b, before segments 502a, 502c, 504b, 504d are deposited, substrate 520 is rotated in the mounting device to orient wafer axis 508 at the selected cant angle Y (in this example, +15 degrees) with respect to the direction 524 along which segments 502a, 502c, 504b, 504d will extend. During deposition, magnetic field M 522 is applied perpendicularly to segments 502b, 502d, 504a, 504c (i.e., normal to direction 524) to induce in each segment an easy axis 512 that is perpendicular to the lengths of segments 502b, 502d, 504a, 504c.

Manufacturing pole pieces 502, 504 from NiFeCo allows the track width of head 500 to be reduced with respect to that achieve with other materials (such as nickel-iron). This is explained in application Ser. No. 07/345,719, filed May 1, 1989, which is incorporated by reference herein. To avoid a loss of anisotropy (i.e., a reduction in the easy axes angles with respect to head axis 508) over time (a phenomena called "magnetic aging"), the segments of pole pieces 502, 504 should be annealed at a high temperature in the presence of the directional magnetic field. The hard baking of the insulating layers formed above and below coil 508 serves also to anneal segments 502a, 502c, 504b, 504d. Hard baking is performed at between 225° and 265° Centigrade, preferably between 255° and 265° Centigrade, and most preferably at 260° Centigrade. Temperatures below 225° Centigrade may not be sufficient to cause the insulating layers to harden sufficiently, while exposing segments 502a, 502c, 504b, 504d to temperatures above 265° Centigrade may degrade the magnetic properties of the segments (due to a phenomenon called "recrystalization," in which the small crystals within the NiFeCo grow, inducing an increase in the coercivity of the material). During hard baking, magnetic field 522 is applied in the direction of easy axes 510 (i.e., at 15 degrees with respect to a normal drawn to axis 508).

Segments 502b, 502d, 504a, 504c are annealed in the presence of a magnetic field that is oriented along easy axes 512 (i.e., at 15 degrees with respect to the normal to axis 508). The temperature at which segments 502b, 502d, 504a, 504c are annealed need not be as high as that applied during hard baking. In fact, the increased temperature and the application of a magnetic field that is opposite to the direction of the easy axes 510 of lower segments 502a, 502c, 504b, 504d causes the angle between easy axes 510 and head axis 508 to be reduced. Thus, the temperature at which segments 502b, 502d, 504a, 504c are annealed should be made as low as possible (such as 200° Centigrade or even as low as 150° Centigrade) while still performing its intended purpose of avoiding time-induced loss of anisotropy. But exposing segments 502b, 502d, 504a, 504c to 200° Centigrade annealing causes a slight reduction in the angles of easy axes 510 of lower segments 502a, 502c, 504b, 504d, for example, to −11.5 degrees with respect to the normal to axis 508. This reduction can be compensated by forming lower segments 502a, 502c, 504b, 504d to have an initially higher angle of anisotropy (such as 19.5 degrees), so that the degradation caused by annealing upper segments 502b, 502d, 504a, 504c causes the angle to be reduced to its desired orientation of 15 degrees to the normal to axis 508. Annealing at 150° Centigrade induces a smaller relaxation (approximately 35°) in easy axes 512, and can be compensated as discussed above.

Segments 502a–502d and 504a–504d are then interconnected by vias 514 formed through holes in the insulating layers to form a complete flux path between tips 503 and 505.

Segment 502a is shown in detail in FIG. 10. Segment 502a extends from narrow tip 503 to a somewhat broader distal region 507 at which via 514 is formed. One side of segment 502a (the right side in FIG. 10) extends perpendicularly from tip 503 a short distance, but over the majority of its length the side forms a relatively large angle (e.g., 45°) with axis 508. The opposite side of segment 502a remains perpendicular to tip 503 for a somewhat greater distance, and is then bent at a shallow angle (such as 5°) with respect to axis 508.

Figure 2A:
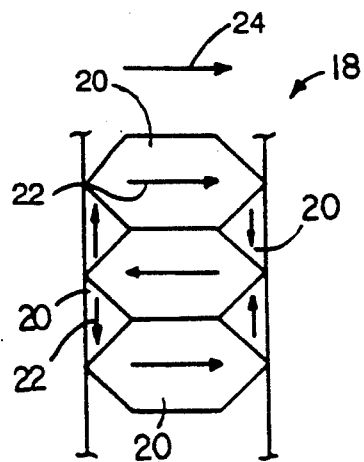
FIGS. 2A-2C illustrate the domain structure of a ferromagnetic material at rest (FIG. 2A), during flux conduction by wall motion (FIG. 2B), and during flux conduction by rotation (FIG. 2C).
Figure 2B:
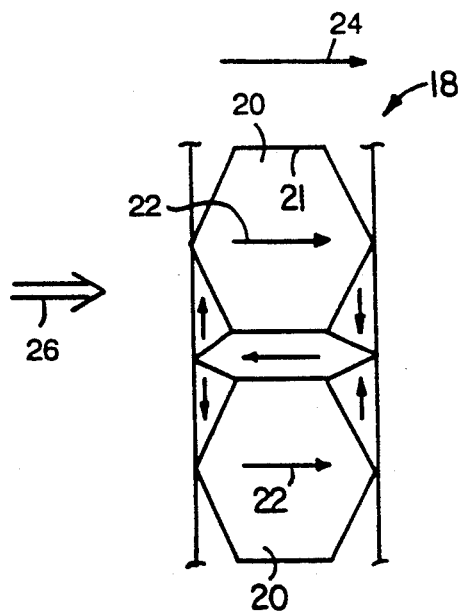
Figure 2C:
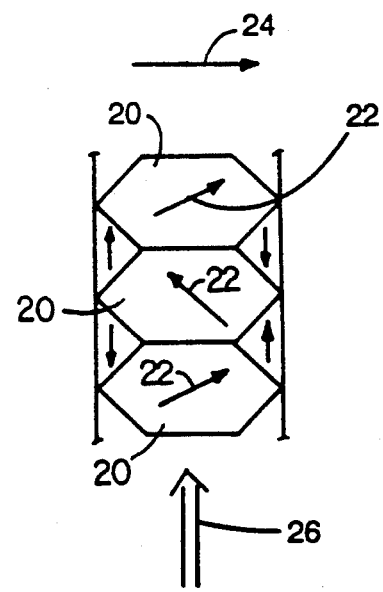

The resultant shape of segment 502a is such that a straight line 509 drawn from the center of tip 503 to the center of via 514 forms an angle with axis 508 that approximately equals the desired cant angle of the segment (e.g., 15°) and that passes entirely through center domains 20 (see FIG. 2A), rather than edge domains, of segment 502a. Easy axis 510 of segment 502a (i.e., the orientation of the magnetic dipoles in the center domains) is perpendicular to line 509. As a result, magnetic flux flowing into tip 503 near the center thereof will conduct entirely by rotation along line 509 through the center domains, back to via 514. Said another way, line 509 represents a "line-of-sight" path for the conduction of flux entirely by rotation from tip 503 to via 514 (and thus to the next segment—segment 502b—in the flux path). Although a small amount of flux that enters tip 503 near its edges will conduct by wall motion from the edge domains (see FIG. 2A) to a center domain before conducting by rotation along line 509, as discussed below the overall effect of the wall motion conduction is minimal.

Note that segment 502d, which contains the other pole tip 505, is essentially the mirror image of segment 502a and thus provides a similar "line-of-sight" rotational flux conduction path between tip 505 and the via 514 that connects segment 502d with segment 504d.

In operation, magnetic flux F that enters, e.g., tip 503 is conducted by rotation down the length of segment 502a due to the perpendicular orientation of easy axis 510 to the direction of flux conduction (and the above-discussed "line-of-sight" flux path through the center domains). Flux F continues to conduct by rotation as it passes through segment 502b, because the flux remains perpendicular to an easy axis—axis 512. Conduction by rotation continues as flux F sequentially conducts through segments 502c, 504a, 504b, 504c, 504d, and 502d to tip 505. As discussed above, some Flux F conducts partially by wall motion is tips 503, 505. The small angle (15°) between segments 502a, 502d and tips 503, 505, respectively, minimizes the amount of conduction by wall motion in tips 503, 505. Moreover, the overall effect of the wall motion conduction is small. This is due to both the short length of each tip 503, 505 (which results in each tip presenting a relatively small impedance to the flux, despite the partial conduction occurring by wall motion) and the fact that near the pole tips the conductance of the leakage path between poles 502, 504 is relatively low (thereby presenting a relatively large impedance to the flux).

During the round-trip conduction of flux through poles 502, 504, flux F interacts with coil 506 four times, due to the intertwined configuration of segments 502a–502d, 504a–504d and coil 506. The first interaction occurs as flux F passes from below coil 506 to above it as flux F conducts through segments 502a, 502b. Then, flux F is directed from above coil 506 to below it as the flux passes through segments 502c and 504a, creating the second flux interaction. This process continues, with the third interaction being made by the flux conduction through segments 504b and 504c, and the fourth and final interaction being induced by the flow of flux F through segments 504d and 502d. As a result, the electrical signal induced in coil 506 (during reading) and the level of flux generated in poles 502, 504 (during writing) is increased by approximately a factor of four over heads constructed with only a single flux interaction (per coil winding). Note that the configuration of head 500 provides essentially a doubling of the number of flux interactions over that of head 200 (FIG. 5).

Figure 12:
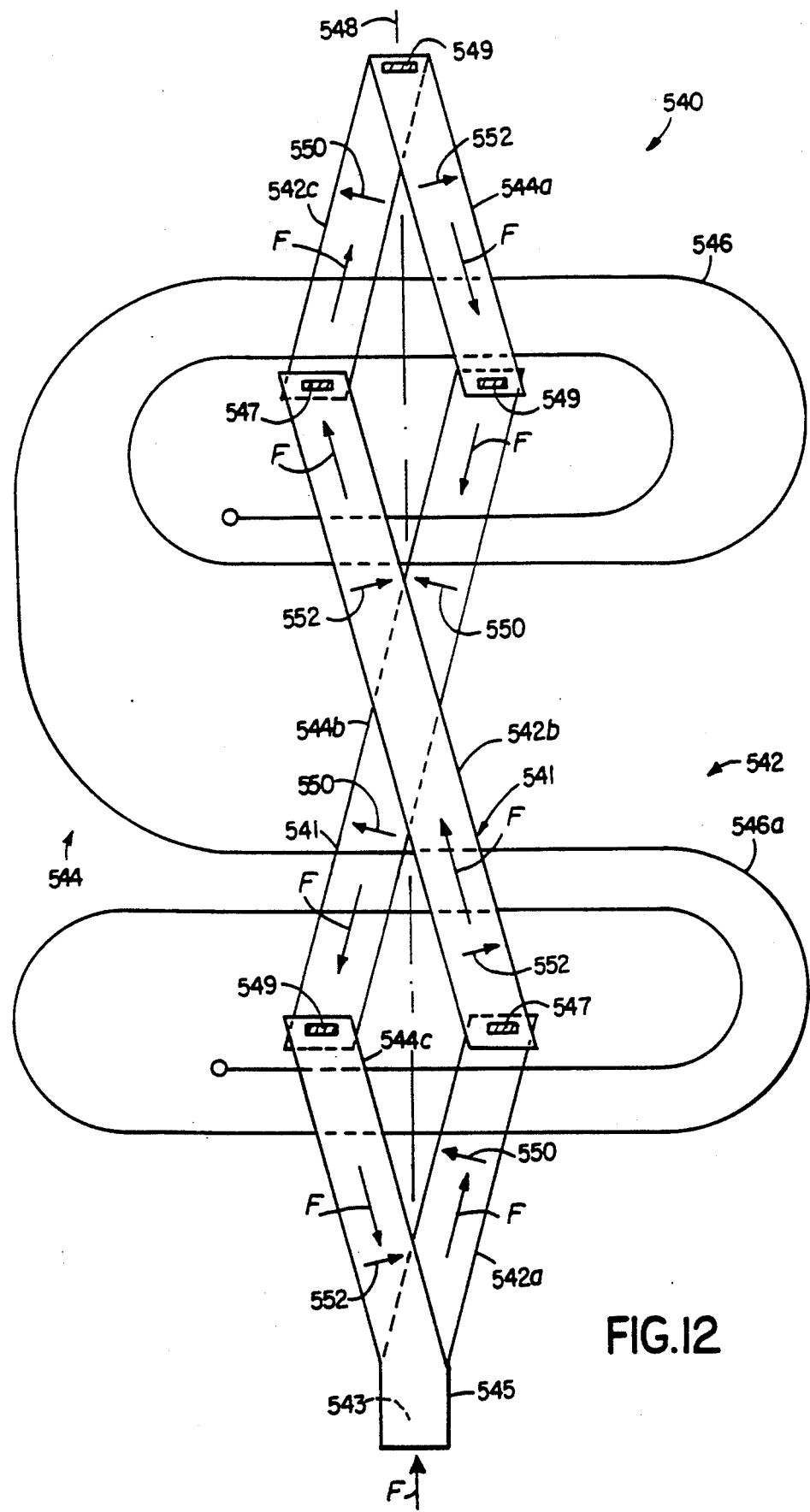
FIG. 12 depicts an alternative to the embodiment of the thin film magnetic head of FIG. 4.

Referring to FIG. 12, magnetic head 540 includes a yoke 541 with a "criss-cross" construction the shape of which resembles a "figure-eight." That is, the poles 542, 544 of yoke 541 have segments (shown schematically) that define the "loops" of the figure-eight and that cross one another along the axis 548 of head 540. The segments of poles 542, 544 also are intertwined with the windings of coils 546a and 546b. In addition, the segments of poles 542, 544 have easy axes of magnetization oriented perpendicularly to their respective lengths so that magnetic flux conducts essentially purely by rotation as the flux passes through poles 542, 544 between tips 543, 545. Tips 543, 545 are in registration.

Pole 542 includes three segments 542a–542c. Segments 542a and 542c are disposed in the lowermost layer (strata A) of head 540, and are interconnected by vias 547 to segment 542b, which is disposed in the uppermost layer (strata C) of the structure. Likewise, pole 544 includes three interconnected segments 544a–544c. Segment 544b is located in strata A, and the ends of segment 544b are respectively connected by vias 549 to segments 544a and 544c, which are arranged in strata C. A via 549 also connects segments 542c and 544a in the region of yoke 541 disposed opposite to tips 543, 545. Note that segments 542b, 544b are not interconnected where they cross one another.

The manufacture of head 540 is essentially the same as discussed above. Lower segments 542a, 542c, 544b are oriented obliquely (such as at +15 degrees) to head axis 548 and are formed (and annealed) in the presence of a directional magnetic field to induce easy axes of magnetization 550 therein. Easy axes 550 are oriented at −15 degrees to a normal to head axis 548. After interconnected coils 546a, 546b (and their associated hard-bake insulation layers) are deposited, upper pole segments 542b, 544a, 544c are deposited at an angle of −15 degrees to head axis 548. The deposition (and subsequent annealing) of segments 542b, 544a, 544c takes place in the presence of a directional magnetic field to yield easy axes of magnetization 552 at +15 degrees with respect to the normal to head axis 548. Note that easy axes 550, 552 are perpendicular to the lengths of their respective pole segments and are at angle of 30° to each other.

The operation of head 540 is similar to that of head 100 (FIG. 4) in that two flux interactions are provided with each coil 546a, 546b by the intertwined segments and coil windings. That is, flux F interacts with coil 546a as the flux conducts away from tip 543 through segments 542a, 542b; as the flux returns to tip 545, it again interacts with coil 546a as the flux passes through segments 544b and 544c. Likewise, flux F interacts twice with coil 546b during a 30 round trip through poles 542, 544—once as the flux couples through segments 542b and 542c, and again as the flux is directed through segments 544a and 544b.

But compared with head 100 (FIG. 4), the amount of flux conduction by wall motion in head 540 is reduced even further. This is due to the canted orientation of pole segments 542a–542c and 544a–544c and easy axes 550, 552 and the "line-of-sight rotational flux conduction path discussed above. That is, in each segment 542a–542c and 544a–544c, the direction of flux conduction is perpendicular to the orientations of respective easy axes 550, 552. As a result, flux F conducts by rotation, rather than by wall motion, in poles 542, 544, even in the regions in which the pole segments intersect.

It may be appreciated that segments and coils may be added to poles 542, 544 to form additional "figure-eight" loops along axis 548 and provide still more flux interactions. In addition, one or more of the loops and its associated coil may be configured to provide more than two flux interactions (such as by fashioning the loop and coil as shown in FIG. 9) or a single flux interaction.

Figure 13:
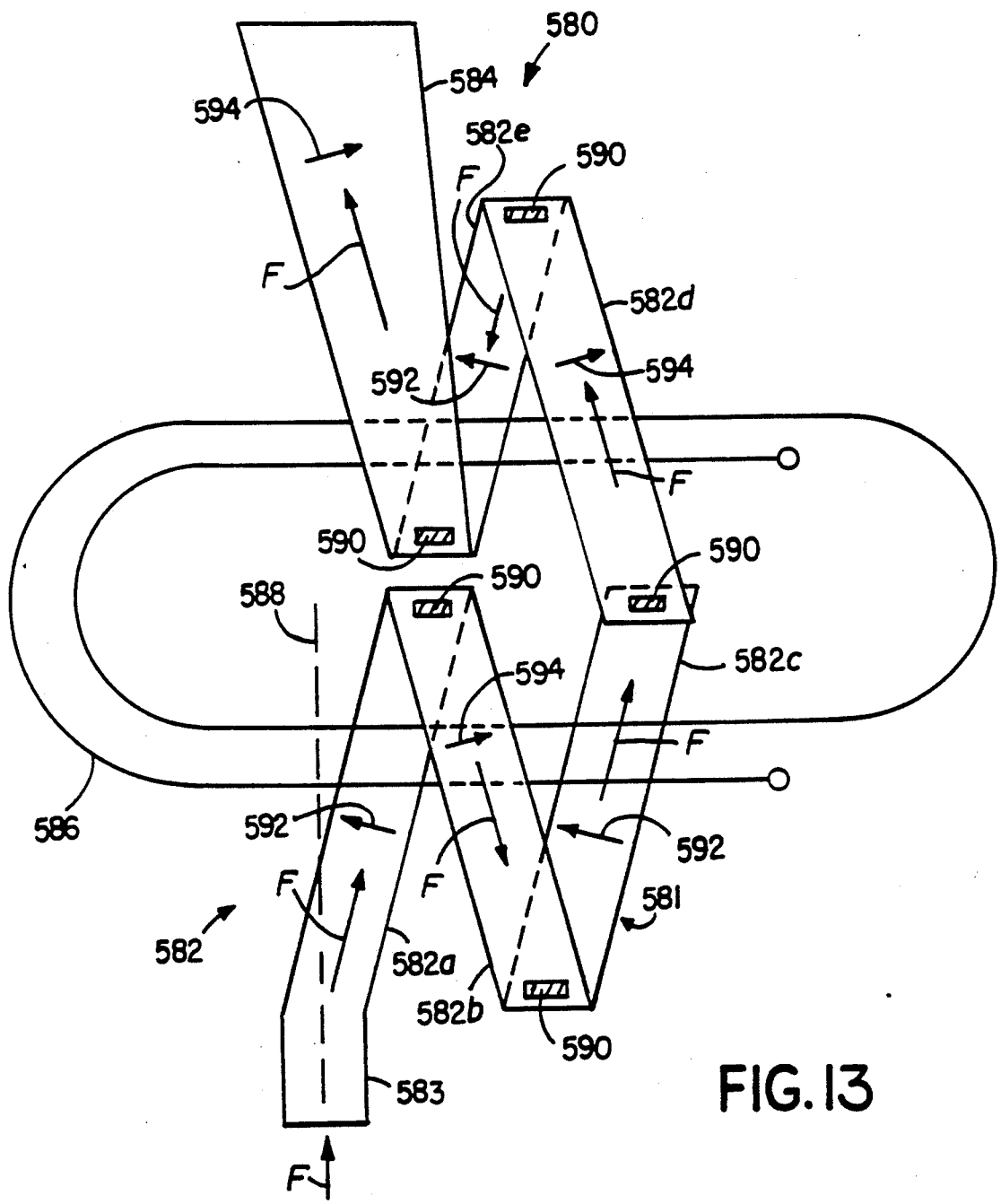
FIG. 13 shows a monopole head with a magnetic tail in accordance with still another embodiment of the invention.

FIG. 13 schematically shows a monopole thin film head 580 constructed according to the invention. The yoke 581 of head 580 includes a single pole 582, made from five segments 582a–582e, and a magnetic "tail" 584. Segments 582a–582e and tail 584 are alternately disposed in layers (i.e., strata C and A) above and below the layer (i.e., strata B) in which coil 506 lies. Segments 582a, 582c, and 582e are disposed in strata A and are oriented at an oblique angle (such as +15 degrees) with respect to the axis 588 of head 580. Segments 582b and 582d and magnetic tail 584 lie in strata C and are arranged at an opposite oblique angle (i.e., −15 degrees) to head axis 588. Segments 582a–582e and magnetic tail 584 are successively interconnected as shown by vias 590 which pass through strata B.

The process steps for manufacturing head 580 are similar to those discussed above. Deposition (and subsequent annealing) of lower segments 582a, 582c, and 582e occurs in a magnetic field the direction of which is transverse (e.g., perpendicular) to the lengths of the segments. This induces easy axes of magnetization 592 in segments 582a, 582c, and 582e arranged at an angle of −15 degrees to the normal to head axis 588. After coil 586 and its associated hard-bake insulation layers are formed, upper segments 582b, 582d and magnetic tail 584 are deposited (and annealed) in the presence of a magnetic field oriented in the opposite direction with respect to head axis 588. This induces easy axes of magnetization 594 at +15 degrees (to the normal to axis 588) in segments 582b, 582d and magnetic tail 584. The surface area of magnetic tail 584 is made much larger than that of segments 582a–582e (such as at a ratio of 5:1, or even 10:1) to cause tail 584 to present a low impedance leakage path to the surrounding air. Tail 584 thus serves as a "magnetic ground" for pole 582.

Tail 584 may be constructed to promote flux conduction by rotation in a direction transverse to the length of tail 584 as well as along the length of tail 584 (an effect known as "flux spreading"). For example, tail 584 may be laminated as discussed above or as described in copending application Ser. No. 07/227,808, filed on Aug. 3, 1988, which is incorporated herein by reference.

During operation, flux F conducts by rotation through each segment 582a–582e and tail 584, because each path presents an easy axis of magnetization that is perpendicular to the direction of flux conduction. As discussed, a small amount of flux conduction by wall motion occurs in the area of pole tip 583 (but this is minimized by constructing segment 582a in a manner similar to that shown in FIG. 10 to provide a "line-of-sight" rotational flux conduction path between tip 583 and via 590). There may also be a certain amount of conduction by wall motion through tail 584, due to flux spreading in tail 584. Overall, however, conduction by rotation greatly predominates throughout head 580.

Pole 582 and tail 584 are intertwined a total of three times with coil 586, thereby providing three interactions between flux F and coil as flux conducts from tip 583 to tail 584. The first interaction occurs as flux F travels from below coil 586 to above it via segments 582a and 582b. Segments 582c and 582d provide the second interaction by directing the flux from above coil 586 to below it. The third and final interaction occurs when flux is directed from below coil 586 to above it via segment 582e and tail 584.

Still other embodiments are within the scope of the claims. For example, the pole segments and easy axes may be oriented at angles other than 15 degrees, according to the pole configuration desired for a given application. Ferromagnetic materials other than NiFeCo, for example, nickel-iron alloys, may be used. Other temperatures may be employed during hard baking and annealing, and other annealing techniques (such as laser annealing) may be used.

I claim:

1. A thin film magnetic transducer formed in a plurality of layers and comprising
a yoke that includes at least one arm having segments respectively lying in separate said layers and connected through a transition layer, at least one of said segments being disposed generally along a longitudinal axis of said transducer and having an easy axis of magnetization oriented transverse to a direction of flux conduction through said segment and at an oblique angle to said longitudinal axis, and
a coil having at least one turn, said yoke and said coil being intertwined to provide more than two flux interactions between said yoke and said at least one turn.

2. The transducer of claim 1 wherein each one of said segments is disposed generally along said longitudinal axis and has an easy axis of magnetization oriented transverse to a direction of flux conduction through said segment and at an oblique angle with respect to said longitudinal axis, whereby said yoke conducts flux predominantly by rotation rather than by wall motion.

3. The transducer of claim 2 wherein each one of said segments is disposed at an oblique angle with respect to said longitudinal axis and has said easy axis oriented generally perpendicular to said segment.

4. The transducer of claim 1 wherein said segments are connected by a via that passes through said transition layer.

5. The transducer of claim 1 wherein said coil lies at least in part in said transition layer.

6. The transducer of claim 1 wherein said yoke further comprises a second arm having segments respectively lying in separate said layers and connected through said transition layer, said second arm being connected to said one arm to form a flux path with a storage medium.

7. The transducer of claim 6 wherein a segment of said second arm is connected to a segment of said one arm through said transition layer.

8. The transducer of claim 6 wherein each one of said segments of said second arm is disposed generally along said longitudinal axis and has an easy axis of magnetization oriented transverse to a direction of flux conduction through said segment and at an oblique angle with respect to said longitudinal axis, whereby said second arm conducts flux predominantly by rotation rather than by wall motion.

9. The transducer of claim 8 wherein each one of said segments of said second arm is disposed at an oblique angle with respect to said longitudinal axis and has said easy axis oriented generally perpendicular to said segment.

10. The transducer of claim 1 wherein said yoke includes a single said arm constructed to form a flux path with a storage medium.

11. The transducer of claim 10 wherein said arm includes a tip arranged to be disposed adjacent to a storage medium and a region constructed to cause flux in said arm to be radiated from said arm by said region.

12. The transducer of claim 1 wherein said coil includes multiple turns, said yoke and said coil being intertwined to provide more than two flux interactions between said yoke and each one of said turns.

13. The transducer of claim 1 wherein said yoke comprises an alloy of nickel-iron-cobalt.

14. A thin film magnetic transducer comprising
a yoke including at least one arm having at least one easy axis of magnetization, and
a coil having at least one turn, said yoke and said coil being intertwined to provide more than two flux interactions between said yoke and said at least one turn,
said arm having a plurality of elongated segments oriented obliquely to each other and having easy axes of magnetization respectively transverse to the directions of flux conduction through said segments, said segments being joined together to direct flux through said coil, the easy axis of magnetization of at least two of said segments that are joined together being oriented in different directions.

15. The transducer of claim 14 wherein said transducer is formed in a plurality of thin film layers, and said oblique segments lie in separate said layers, said segments being joined together through a transition layer disposed between said layers.

16. The transducer of claim 15 wherein said coil is disposed at least in part in said transition layer.

17. The transducer of claim 14 wherein said yoke further includes a second arm having at least one easy axis of magnetization, said second arm having elongated segments oriented obliquely to each other and easy axes of magnetization respectively transverse to the directions of flux conduction through said segments, said segments of said second arm being joined together and a segment of said second arm being connected to a segment of said one arm to direct flux through said coil.

18. The transducer of claim 17 wherein said transducer is formed in a plurality of thin film layers, and said oblique segments of said second arm lie in separate said layers, said segments being joined together through an intermediate portion extending between said layers.

19. The transducer of claim 17 wherein said transducer is formed in a plurality of thin film layers with said oblique segments of said second arm lying in separate said layers and being connected together through a transition layer, said coil lying at least in part in said transition layer.

20. The transducer of claim 17 wherein the easy axis of each one of said segments of said second arm is perpendicular to a direction along which said segment generally extends.

21. The transducer of claim 17 wherein said transducer is formed in a plurality of thin film layers with said oblique segments of each one of said arms lying in separate said layers, the segments that are disposed in a first one of said layers extending generally in a first direction and having easy axes of magnetization perpendicular to said first direction, and the segments that are disposed in a second one of said layers extending generally in a second direction oblique to the first direction and having easy axes of magnetization perpendicular to said second direction.

22. The transducer of claim 17 wherein said segments are intertwined with said coil to provide four flux interactions between said at least one turn of said coil and said yoke.

23. The transducer of claim 14 wherein said yoke comprises a single said arm.

24. The transducer of claim 23 wherein said yoke and said coil are intertwined to provide three flux interactions between said yoke and said at least one turn of said coil.

25. The transducer of claim 14 wherein each one of said segments has an easy axis of magnetization oriented at an oblique angle with respect to a longitudinal axis of said transducer.

26. The transducer of claim 14 wherein the easy axes of magnetization of at least one of said segments is oriented at an oblique angle relative to the easy axis of another one of said segments.

27. A thin film magnetic transducer comprising
   a yoke including at least one arm having at least one easy axis of magnetization, and
   a coil having at least one turn, said yoke and said coil being intertwined to provide more than two flux interactions between said yoke and said at least one turn,
   said arm having a plurality of elongated segments oriented obliquely to each other and having easy axes of magnetization respectively transverse to the directions of flux conduction through said segments, the easy axis of each one of said segments being perpendicular to a direction along which said segment generally extends, said segments being joined together to direct flux through said coil.

28. A thin film magnetic transducer comprising
   a yoke including a single arm having at least one easy axis of magnetization, and
   a coil having at least one turn, said yoke and said coil being intertwined to provide more than two flux interactions between said yoke and said at least one turn,
   said arm having a plurality of elongated segments oriented obliquely to each other and having easy axes of magnetization respectively transverse to the directions of flux conduction through said segments, said segments being joined together so that flux can pass therebetween without flowing parallel to the easy axes of said segments, and
   said arm including a portion of relatively small surface area adapted to be disposed adjacent to a storage medium and transfer flux between said arm and said medium, and a portion that has a relatively large surface area to cause flux in said arm to be radiated from said arm to regions adjacent to said transducer.

29. The transducer of claim 1 wherein said at least one segment is disposed at an oblique angle with respect to said longitudinal axis and said easy axis is oriented generally perpendicular to said segment.

30. The transducer of claim 1 wherein the easy axes of magnetization of said at least two segments are oriented obliquely to each other.

31. A thin film magnetic transducer comprising
   a yoke including at least one arm having at least one easy axis of magnetization, and
   a coil having at least one turn, said yoke and said coil being intertwined to provide more than two flux interactions between said yoke and said at least one turn,
   said arm having a plurality of elongated segments each of which is disposed generally along a longitudinal axis of said transducer,
   said segments being oriented obliquely to each other and having easy axes of magnetization respectively transverse to the directions of flux conduction through said segments and at an oblique angle with respect to said longitudinal axis, said segments being joined together to direct flux through said coil.

* * * * *

UNITED STATES PATENT AND TRADEMARK OFFICE
CERTIFICATE OF CORRECTION

PATENT NO. : 5,311,386

DATED : May 10, 1994

INVENTOR(S) : Michael L. Mallary

It is certified that error appears in the above-identified patent and that said Letters Patent is hereby corrected as shown below:

Title page:
Please add after item [73] and before [21]

--[*] Notice: The portion of the term of this patent subsequent to February 2, 2010 has been disclaimed.--

In the "[75] Inventor" section replace "Michael I. Mallary" with --Michael L. Mallary--.

In the References Cited section, in the Lazzari reference, after "3190-3193" insert --, 1989--.

Col. 5, line 66, replace "3" with --36--.

Col. 13, line 41, replace "35°" with --3.5°--.

Signed and Sealed this

Second Day of July, 1996

BRUCE LEHMAN

*Attest:*

*Attesting Officer*     Commissioner of Patents and Trademarks